United States Patent [19]
Cooney, Jr.

[11] Patent Number: 6,121,032
[45] Date of Patent: *Sep. 19, 2000

[54] COMPOSITIONS AND PROCESSES USEFUL FOR TREATMENT OF MACERATED FOODSTUFF WASTE PRODUCTS ESPECIALLY USEFUL IN CONJUNCTION WITH A GARBAGE DISPOSAL APPARATUS

[75] Inventor: Edward Matthew Cooney, Jr., West Orange, N.J.

[73] Assignee: Reckitt Benckiser Inc., Wayne, N.J.

[ * ] Notice: This patent is subject to a terminal disclaimer.

[21] Appl. No.: 09/036,474

[22] Filed: Mar. 6, 1998

[30] Foreign Application Priority Data

Apr. 9, 1997 [GB] United Kingdom ................. 9707212

[51] Int. Cl.[7] .................. C12N 9/20; C12N 9/26; C12N 9/42; C12N 1/12
[52] U.S. Cl. .................. 435/198; 435/201; 435/209; 435/219; 435/252.1
[58] Field of Search .................. 435/198, 201, 435/209, 219, 252.1

[56] References Cited

U.S. PATENT DOCUMENTS

| | | | |
|---|---|---|---|
| 2,505,360 | 4/1950 | Jeffreys | 435/203 |
| 3,506,582 | 4/1970 | Gertzman | 510/195 |
| 3,983,002 | 9/1976 | Ohya et al. | 435/209 |
| 4,342,650 | 8/1982 | Erickson et al. | 210/606 |
| 4,566,985 | 1/1986 | Bruno et al. | 134/42 |
| 5,464,766 | 11/1995 | Bruno | 435/187 |
| 5,531,898 | 7/1996 | Wickham | 210/606 |
| 5,905,037 | 5/1999 | Cooney, Jr. et al. | 435/264 |

FOREIGN PATENT DOCUMENTS

| | | |
|---|---|---|
| 0 421 223 A1 | 4/1991 | European Pat. Off. . |
| 0 720 974 A1 | 7/1996 | European Pat. Off. . |
| 44 28 834 C1 | 9/1995 | Germany . |
| WO93/19013 | 9/1993 | WIPO . |
| WO95/25707 | 9/1995 | WIPO . |

OTHER PUBLICATIONS

Jeffreys and Company, "Grease Trap Formula" Product Data Sheet, Apr. 1992.

Patent Abstracts of Japan, vol. 013, No. 569 (C–666), Dec. 15, 1989 and JP 01 236983 A, Sep. 21, 1989.

Database WPI, Section Ch, Week 9443, AN 94–34363, XP002069608 and JP 06 269 759 A.

Patent Abstracts of Japan, vol. 097, No. 005, May 30, 1997 and JP 09,010757 A, Jan. 14, 1997.

*Primary Examiner*—Jon P. Weber
*Attorney, Agent, or Firm*—Fish & Richardson P.C.

[57] ABSTRACT

Compositions and processes useful for the treatment of macerated foodstuff waste products, particularly foodstuff waste solids macerated by a garbage disposal apparatus. The compositions comprise per gram:

0–50%wt. bacteria complex;

75–99.99%wt. of an enzyme mixture containing:

at least $5 \times 10^3$ CDU/gram protease enzymes;

at least $1.2 \times 10^4$ MWU/gram amylase enzymes;

at least $1 \times 10^2$ LU/gram lipase enzymes;

at least $1 \times 10^3$ CU/gram cellulase enzymes;

0–50%wt. of a preservative constituent, preferably propylene glycol;

0–50%wt. of one or more nonionic surfactants;

0–10%wt. of one or more optional constituents, selected from: coloring agents, fragrancing compositions, odor neutralizing compositions, micronutrients, pH adjusting agents, thickening agents.

9 Claims, No Drawings

COMPOSITIONS AND PROCESSES USEFUL FOR TREATMENT OF MACERATED FOODSTUFF WASTE PRODUCTS ESPECIALLY USEFUL IN CONJUNCTION WITH A GARBAGE DISPOSAL APPARATUS

BACKGROUND OF THE INVENTION

The present invention is directed to compositions and processes useful for the treatment of macerated foodstuff waste products.

Although many buildings and other installations are served by large scale sewage processing and treatment plants, such as municipal sewage treatment facilities, in many cases residential and commercial buildings rely upon the use of the septic tank or a cesspool as their sole sewage treatment system. Such septic systems are well known in the art and consist generally of a large tank into which one or more waste streams originating from lavatories, toilets and sinks in such buildings are directed. The septic tank or cesspool functions as a holding and fermenting tank for the collection and/or biological breakdown of waste stream products, especially solids. This system is simple, and has been used for a very considerable period of time.

For the past several decades, garbage disposal units, typically attached to the drain of a kitchen sink or other food processing sink, have become popular in many residential and commercial establishments. Such a device is effective in taking table scraps and other food scraps and grinding, pulverizing, or otherwise comminuting the food scraps into small particles which are readily flushed down the drain lines and towards a sewage treatment facility. These have found widespread and popular use wherein a municipal or other large scale sewage treatment plant is ultimately used to treat the waste stream, however the same cannot be said where a septic tank or cesspool is the primary or sole sewage treatment plant. This is due to the fact that unlike raw sewage which includes digested materials (feces) as well as other readily decomposable products, foodstuff waste products (food scraps and the like) are not predigested and thus are generally considered to require a substantially longer decomposition time in a septic tank. For a garbage disposal unit to be useful with a septic tank system, a substantial increase in the working volume of the septic tank is believed to be necessary in order to ensure the proper functioning of the septic tank. This increase in volume is typically recommended to be at least 50% greater volume than a comparable installation where a garbage disposal unit is not present. Such an increase in the working volume of the septic tank is required so as to permit for the longer time required to ensure the decomposition of such macerated but undigested foodstuff waste products. Thus, the installation and use of garbage disposal devices is generally not considered feasible in buildings, the waste streams of which are serviced by a septic tank or cesspool, without increasing the service capacity of said cesspool and/or septic tank by at least 50% volume. While such may be possible for new installations of septic tanks, the increased costs for the larger septic tank, and the increased installation costs renders such an approach economically undesirable or unfeasible. With already existing installed septic tanks, the required increase in volume which is necessitated by adding such a garbage disposal unit is even more unfeasible from an economic perspective, as removing the already existing septic tank, and replacing it with a new septic tank of a substantially larger volume would be required.

The art has proposed various systems to improve the utility of garbage disposal devices and systems wherein a septic tank or cesspool is the primary sewage treatment system, with an effort to improve the efficacy of such of garbage disposal devices and these sewage treatment systems.

Disclosed in U.S. Pat. No. 5,114,081 is a process wherein a waste stream containing water and foodstuff waste products is treated to grind or otherwise comminute products to a reduced average size. Thereafter the waste stream is separated into a liquid fraction and a solid fraction which latter fraction consists of the dewatered comminuted foodstuff waste products. This dewatered solid fraction is then treated by the use of a 'bacillus growing bed' prepared using a processed pulverized wood substrate. The former, liquid fraction is flushed to a sewer or other waste stream as it contains little or no foodstuff waste products.

Discussed in U.S. Pat. No. 3,823,879 is an apparatus which may be attached to a waste stream outlet of a conventional garbage disposal apparatus; the said apparatus includes includes a 'spin basket' in a housing wherein collected comminuted or ground foodstuff waste solids can be dewatered by activating and spinning the spin basket. The spin basket and its dewatered solids are intended to be periodically removed from the apparatus according to U.S. Pat. No. 3,823,879 and it is noted that the collected dewatered solids may then deposited on a compost heap. This patent cites its apparatus and process as one solution to overcoming the known art problems associated with the use of a conventional garbage disposal apparatus with a septic tank.

Also cited in U.S. Pat. No. 4,917,311 is a garbage disposal apparatus for grinding, then separating solids from liquid fractions and collecting the solid fraction in a bin for collection and periodic disposal. According to this system the liquid fraction is flushed down to a sewer line or sewage treatments system as it is substantially free of collected comminuted or ground foodstuff waste solids.

Known generally to the sewage treatment art are various compositions of matter, generally those which contain a biologically active constituent which is useful in facilitating the decomposition of waste products in a septic tank and/or cesspool. Such compositions are generally, however, directed to be used by instructions in septic tank by providing a quantity of such composition down a drain line, generally accompanied by a flushing flow of water so to ensure the delivery of the composition to the septic tank.

Also known to the art are compositions of matter which are directed to be used as "drain opening" or "drain maintaining" compositions, such compositions also including the biologically active constituent, such as one or more enzymes and/or bacteria. Such compositions are directed to be supplied to the drain lines connected between a sink, toilet, or other point of origin of a waste stream and the ultimate sewage treatment facility whether it be septic tank or cesspool, or a municipal sewage line. The function of these compositions of matter is to minimize the buildup over time of organic deposits on the interior of the pipes and other lines connecting the sink, toilet, treatment composition, and the ultimate sewage treatment facility.

A shortcoming of these compositions of matter is that they are designed and targeted to be used in the treatment of organic deposits and buildups either in the drain lines, or in many cases, in a septic tank or other sewage treatment facility. It is to be understood that their efficacy is in great part limited by their delivering system. More specifically, it is understood that wherein a small volume, generally the manufacture's directions require one or two "capfuls"

(1–ounces) generally accompanied by flushing cold water; this procedure immediately significantly dilutes the biologically active constituents prior to the initiation of their activity in facilitating the decomposition of an organic deposit either within the pipe or within the sewage treatment facility. This is especially true wherein a small amount, i.e., 1–capfuls is directed to be flushed down a drain line with water enough so that the biologically active constituent is eventually delivered to a septic tank. Once it arrives in the septic tank, the biologically active constituent is immediately further diluted by the tremendous relative proportion of water there. This condition requires repeated dosings at a regular periodic interval in order to maximize the beneficial effects attendant upon its use.

Thus as may be seen from the foregoing, there exists a real and present need in the art for improved processes and compositions of matter which may be used for facilitating the decomposition of foodstuff waste solids which are to be provided to a septic tank or cesspool as a sewage treatment system.

There also exists a real and present need in the art for processes and compositions of matter which may be used for facilitating the decomposition of foodstuff waste solids which are to be provided to a conventional sewer line, or other sewage treatment system such as a sewage treatment system serving a plurality of residences or buildings such as a municipal sewage treatment system.

In one aspect of the present invention there is provided a process for facilitating the decomposition of foodstuff waste solids, especially where such foodstuff waste solids are macerated by a garbage disposal apparatus which comprises the process step of:

providing an effective amount of a treatment composition as described herein to the macerated foodstuff waste solids either while still present in the garbage disposal apparatus, or to the macerated foodstuff waste product shortly after exiting the garbage disposal apparatus.

In a further aspect of the invention there is provided a treatment composition which is particularly useful for in aiding the decomposition of macerated foodstuff waste product which comprises per gram:

0–50%wt. bacteria complex;

75–99.99%wt. of an enzyme mixture containing:

at least $5 \times 10^3$ CDU/gram protease enzymes;

at least $1.2 \times 10^4$ MWU/gram amylase enzymes;

at least $1 \times 10^2$ LU/gram lipase enzymes;

at least $1 \times 10^3$ CU/gram cellulase enzymes;

0–50%wt. of a preservative constituent, preferably propylene glycol;

0–50%wt. of one or more nonionic surfactants;

0–10%wt. of one or more optional constituents, such as coloring agents including dyes and/or pigments, fragrancing compositions including perfumes, thickening agents, further enzymes, as well as others not recited here but which are known to the art and which do not undesirably reduce the activity levels of the bacteria or enzyme constituents subsequent to the preparation of the treatment composition and prior to its use.

This treatment composition may be in the form of solids such as tabletted solids, in a powdered form, but are most desirably in a fluid form, especially in the form of an aqueous preparation.

DETAILED DISCLOSURE

Bacteria Complex

The bacteria complex according to the invention is a bacteria complex capable of producing one or more enzymes, or is a bacteria/enzyme complex which includes at least one enzyme and/or at least one microorganism which is capable of producing a hydrolytic enzyme. Such a bacteria complex may be provided in an aqueous preparation. Exemplary enzymes include cellulases, amylases, proteases and lipases, among which cellulases and lipases are preferred. These enzymes, as well as commercially available enzymatic preparations comprising the same, are known to the art and are available from a variety of commercial suppliers. Most desirably, bacteria complex comprises at least 1%wt. of the inventive compositions, and the activity is at least $1.0 \times 10^6$ bacteria/gram of bacteria complex forming the at least 1%wt of the inventive compositions. Particularly useful bacteria complexes include those marketed by George A. Jeffreys Co., and which are used in the Examples.

Proteases

Proteases form a part of the treatment compositions according to the invention. Any proteases which are effective in breaking down proteins, particularly animal proteins, may be used in the compositions according to the invention. Useful proteases may be derived from a variety of sources, including microorganisms such as those of genus Aspergillus, and Bacillus. Particularly, proteases derived from microorganisms *Aspergillus niger*, *Aspergillus oryzae*, *Bacillus licheniformis*, and *Bacillus subtilis* are advantageously used.

The activity of proteases may be described as protease units/gram which is established by known methods. Desirably the protease in the enzyme mixture constituent exhibits an activity of at least about $5 \times 10^3$ protease units/gram of the enzyme mixture constituent, and still more desirably the constituent exhibits an activity of at least about $1 \times 10^4$ protease units/gram, but most desirably the constituent exhibits an activity of at least about $5 \times 10^5$ protease units/gram. The activity parameter protease units/gram is interchangeably referred to as "CDU units/gram", or casein digestion units/gram which is known to the art and is determinable by well known techniques. The proteases further desirably exhibit activity in the pH range of about 3.5 to about 13.0, but preferably exhibit activity at a pH in the range of about 7.0 to about 10.5.

Typically the activity of such a protease preparation is provided by the respective supplier. As an alternative, the protease activity may be determined by well known methods, including by the degree of digestion of a casein solution by a proteolytic enzyme. By way of example, one such useful protocol for determining protease activity is described by the following.

This method is based on the principle that the degree of digestion of a casein solution by a proteolytic enzyme, conducted under standard conditions, is proportional to the proteolytic activity of the enzyme. The digested casein solution, upon acidification, products a turbidity which is inversely proportional to the degree of digestion. This turbidity may be measured with ease and reliability in a photo-electric colorimeter.

The CDU method of measuring bacterial proteolytic activity is based upon the Gross-Fuld method (Tauber, *Chemistry and Technology of Enzymes,* 1949, p. 181) and methods used by Tobey and Yousten, Development in *Industrial Microbiology,* 1977, 18:499.)

One CD (casein digesting) unit is defined as the quantity of enzyme which digests 1 mg of casein to the "Standard turbidity end-point" in one hour at 40° C., pH 7.0 under the conditions described in detail below. For convenience, the actual test is conducted at 30° C. for 20 minutes and the appropriate factors are employed in the calculation, as described below.

Under routine laboratory conditions, the method was found to be accurate to +10% and to have precision limits of ±5%. In those special cases where a series of samples is being assayed, all from the same general source, such as samples taken from a tank during the course of a single type of enzyme specimen, the confidence limits for accuracy and precision may be reduced ±5% and ±2.5% respectively.

II. Method

The proteolytic activity of an unknown sample is determined by comparing its activity in the assay described below to those of a series of standard samples with known activity in CDU per gm.

A standard solution of casein (1 mg/ml) is prepared by dissolving 1.0 gm of dry casein in 200 ml distilled water. The solution is made basic by the addition of 50 ml 0.1 N NaOH and is heated with stirring for 15 minutes. 200 ml of distilled water is added to the solution which is cooled to about 30° C. and then neutralized by the addition of 200 ml 0.1 M $KH_2PO_4/Na_2HPO_4$ buffer, pH 6.2. The solution is then adjusted to a final volume of 1 liter with distilled water.

A working standard solution is made from a master standard solution with known activity in CDU per gm. To every 100 ml of working standard solution, which is diluted to a final concentration of about 150 CDU/ml, is added 4 ml 0.1 M KH2PO4/Na2HPO4 buffer, pH 7.0 buffer and 1 ml 2% thiourea solution.

5.0 ml of the casein solution is added to a series of test tubes which are incubated at 30° C. for several minutes to bring them to temperature. To these tubes are added various volumes of the house standard solution and water so that they contain a range of concentrations of the house standard. The total volume of added standard solution and water added to all tubes is 1 ml. For example, a series of 5 standard tubes containing 30, 45, 60, 75 and 90 CDU of working standard and 5 ml of casein solution could be generated. After thorough mixing the tubes are incubated at 30° C. for 20 minutes and then placed in an ice water bath. 4 ml of sodium acetate/glacial acetic acid (0.6 gm per liter/2.0 ml liter), pH 3.85 is added to all the tubes which are mixed by swirling and then put back in the 30° C. water bath. The acid buffer reacts with partially digested casein to produce a colloidal haze which is fully developed within 5 minutes and changes only slightly over the next 10 minutes. Fifteen minutes after addition of acid buffer, transmission (%) readings are made using a photo-electric calorimeter with a 540 nm filter and the galvanometer set at 100% transmission with distilled water. Percent transmission obtained for each sample is plotted against CDU of enzyme in the sample to generate a standard curve. By interpolating transmission values obtained using unknown samples processed in the same way as the standards and appropriately correcting for dilution, it will be possible to establish the proteolytic activity in CDU per ml or gm of the unknown samples.

It is to be understood that the assay method described above is provided by way of illustration and not by way of limitation, and that other known art accepted methods may be used.

Various commercially available protease containing preparations are available, such as ALKAPRO available from the Geo. A. Jeffreys Co., Inc. (Salem Va.) which is an example of a particularly preferred protease preparation. This preparation is used in the Examples described below. The preparation is described to be an alkaline serine-type protease of a bacterial origin, exhibits an enzyme activity level of at least about 400,000 protease units/gram, and is useful in the pH range of 3.5 to about 13.0, exhibiting optimal activity at a pH in the range of about 7.0 to about 10.5.

Proteases derived from other sources other than those elucidated above may also be used.

Amylases

The treatment compositions according to the present invention include amylases. Amylases which find use include those which are effective in the breakdown of starches into sugars. Such useful amylases include those which are referred to as alpha-amylases, beta-amylases, iso-amylases, pullulanases, maltogentic amylases, amyloglucosidases, and glucoamylases as well as other amylase enzymes not particularly elucidated here. These include endo-active, and exo-active amylases. Useful amylases may be obtained from a wide variety of sources, including microorganisms of the genus: Aspergillus, Rhizopus, and Bacillus. By way of non-limiting example, specific microorganisms include: *Aspergillus niger, Aspergillus oryzae, Rhizopus oryzae, Rhizopus niveus, Bacillus subtilis, Bacillus amyloliquefaciens, Bacillus stearothermophilus, Bacillus licheniformis* especially containing a *Bacillus stearothermophilus* gene for alpha-Amylase, *Bacillus subtilis* containing a *Bacillus megaterium* gene for alpha-Amylase, as well as *Bacillus acidopullulyticus*. Other sources include for example, barley malt, and certain animal pancreatic tissue as well as others not elucidated here but which are nonetheless known to the art.

The activity of amylases may be described in units of bacterial amylase units per gram according to known methods such as those disclosed in the Food Chemicals Codex. Useful amylase containing preparations for use in the enzyme mixture of the invention display an activity of at least about $1.2 \times 10^4$ bacterial amylase units per gram (MWU/g), more desirably at least from about $1.2 \times 10^4$ MWU/g to about $2 \times 10^4$ MWU/g and most desirably at least about $1.6 \times 10^4$ MWU/g. These activities may be determined by known techniques.

Typically the amylase activities of preparation are supplied by the supplier of the same. In the alternative, the amylase activities of a preparation may be determined by a variety of known protocols. By way of illustration, one such protocol is described below.

Determination of Liquefying Amylase (Modified Wohlgemuth Method)

This assay is based on determining the time required to hydrolyze starch to a definite sized dextrin as indicated by the color of the dextrin-iodine complex. This color is compared to a color standard.

Color Standard:

A permanent standard is a glass disk color standard No. 6205-5 sold by Hellige Company, New York. The disk is mounted over a lightly screened 100 watt "daylight" bulb used for color comparisons.

Another type of color standard may be prepared by dissolving 25.0 g. of cobaltous chloride hexahydrate and 3.84 g. of potassium dichromate in 100 ml. of 0.01N hydrochloric acid. In a stoppered bottle or comparison tube this standard is stable indefinitely.

Reagents:

1. Starch Solution

Prepare a slurry of soluble starch (4 g. for each 100 ml. on the basis of dry weight of starch determined by dehydrating for 24 hours at 100° C.). Add the slurry to vigorously boiling water and rinse the starch quantitatively into the boiling water. Allow the starch solution to come to a boil again and boil exactly three (3) minutes. Cool and dilute to volume.

Stock Iodine

Dissolve 5.5 g. iodine crystals and 11 g. potassium iodide and dilute to 250 ml. with water. Store in the dark and prepare fresh monthly.

Dilute Iodine 2 ml. of stock iodine and 20 gm. of potassium iodide made up to 500 ml. with distilled water.

Buffers:

a. Bacterial Amylase

Phosphate buffer, pH 6.C, consisting of 100 ml. of 1N $Na_2HPO_4$ and 960 ml. of 1N $NaH2PO_4$.

b. Fungal Amylase

Acetate buffer, pH 5.0, prepared by mixing 200 ml. of 2N acetic acid, 130 ml. of 2N NaOH and 50 ml. of water.

c. Pancreatic Amylase

Phosphate buffer, pH 6.9, consisting of 900 ml. of 1N $Na2HOP_4$, 350 ml. of 1N $NaH_2PO_4$, 417 ml. of 1M NaCl and 417 ml. of water.

Procedure:

100 ml. of 4% starch plus 40 ml. of buffer are diluted to volume with water in a 200 ml. volumetric flask. Into each test tube pipette 5.0 ml. of this buffered starch and 4.0 ml. of water (assuming 1.0 ml. of enzyme solution is to be used).

Place the test tubes in a thermostatically controlled water bath maintained at 40° C.±0.05°and allow the solution to come to temperature (at least 10 minutes). Add 1 ml. of the approriately diluted enzyme solution*, and mix well. Note the exact time at which the enzyme is added and at noted times thereafter, remove a 1.0 ml. sample of the digest and add it to 5.0 ml. of dilute iodine. Mix by inversion and compare the color with the Hellige color disk in front of a lightly screened 100 watt "daylight" bulb.

If the estimated potency is 2,000,000 MWU/gm., a dilution of 0.1 gm. of enzyme in 1,000 cc. of water will provide the proper dilution.

As the color approaches that of the disk, take samples more frequently, preferably at 15 second intervals. The endpoint is the time of digestion when the sample gives a color matching that of the standard disk.

For maximum accuracy the endpoint time should fall between 5 and 25 minutes. If it does not, the enzyme sample solution should be adjusted accordingly.

$$\text{CALCULATION: } \frac{100}{\text{mg. of enzyme in digest}} \times$$

$$\frac{30}{\text{time in minutes to reach endpoint}} \times 1000 = \text{MWU/gm.}$$

1 MWU digests 1.0 mg. of soluble starch in 30 minutes under testing conditions.

It is to be understood that the protocol described is by way of illustration and not by way of limitation, and that other known art assay methods may also be used.

Useful amylase containing preparations are available from a variety of commercial sources including for example, a product marketed as IC 24,000 by the Geo. A. Jeffreys & Co., Inc. (Salem, Va.). This amylase preparation is used in the Examples, below. This preparation is described to be an amylase/carbohydrase preparation from a bacterial origin, and exhibits an enzyme activity level of at least about 24,000 bacterial amylase units per gram.

Lipases

Lipases which find use in the treatment compositions of the invention are any which are found effective in the reduction of fats and oils. Fats which are particularly susceptible to decomposition by lipases originate in animal or plants. Such fats are generally deposited as food residues which are introduced into a drain and drain conduit as they are expected to constitute an appreciable portion of a waste stream. Fats and oils, particularly those which are solidified in a non-fluid form, are also known to be an extremely difficult deposit to remove due to the hydrophilic nature of fats, which is to resist dissolution in water.

In the compositions according to the invention, any lipase which is effective in the degradation of fats or oils which originate in animals or plants may be used. Useful lipases may be derived from a variety of sources including microorganisms of the genus Aspergillus, Rhizomucor and Candida. Particularly preferred microorganisms include those which include *Aspergillus niger, aspergillus oryzae, Rhizomucor miehei, Candida rugosa*. Lipases which also may be used include which may be derived from animal sources such as from animal pancreatic tissues as from forestomachs of certain livestock including calves, kids and lambs.

The activity of the lipases may be expressed in various units, including the units of fatty acid (butyric acid) liberated from tributyrin, at pH 7.0 and 30° C. Such units are also interchangeably referred to as lipase units or "LU". The lipases which are present in the enzyme mixture of the invention display activities of at least about 100 LU/gram, more desirably at least about 1000 LU/gram and most desirably from about 100–1000 LU/gram of the enzyme mixture.

Typically the activity of the amylases in an amylase containing preparation are available from the supplier. However, known art methods may be used to determine the lipase activity of a preparation. One example of such an assay method for determining amylase activity is as follows:

Lipase/Esterase—pH-stat Method on a Tributyrin Substrate

The method is based on the hydrolysis of tributyrin by the enzyme, and the alkali consumption is registered as a function of time.

Unit Definition

1 LU (Lipase Unit) is the amount of enzyme which liberate 1 µmol titratable butyric acid per minute under the given standard conditions.

Standard Conditions

Temperature . . . 30.0° C.

pH . . . 7.0

Emulsifier . . . Gum Arabid

Substrate . . . tributyrin

Apparatus pH-stat including

Autoburette 0.25 ml pH-meter

Titrator

Recorder

Titration set-up with stirring

Blender

Thermostat water bath 30.0° C.

Reagents 0.05 N NaOH Reagent

Empty a 0.1 N NaOH ampoule (Merck Titrisol no 9959) quantitatively into a 2000 ml volumetric flask.

Add demineralized water up to 2000 ml and stir under cover.

Maximum advisable storage time: Depending on air contact.

Emulsification Reagent

Weigh out 17.9 g NaCl+0.41 g $KH_2PO_4$ in a 1000 ml beaker add 400 ml demineralized water and add 540 ml glycerol and under vigorous stirring add 6.0 g Gum Arabic (Merck art. 4282). Stir until dissolved.

Transfer to a 1000 ml measuring flask and add demineralized water to the mark.

Max. advisable storage time: 1 months at room temperature.

Benzoic Acid Reagent

Weigh out 0.240 g benzoic acid into a 200 ml volumetric flask. Add distilled or demineralized water to volume and dissolve by stirring and maintaining at 30–40C.

Substrate Emulsion

Pipet 15.0 ml of Tributyrin into a Waring blender and add
50.0 ml gum arabid reagent and
235 ml demineralized or distilled water
Make this preparation fresh each day.

Enzyme Solutions

The enzyme preparations are diluted in distilled/demineralized water (see glycine buffer dissolution treatment procedure addendum) to an approximate concentration of 1.0 LU/ml. Acceptable dilution is 0.50–2.0 LU/ml.

Procedure

1. Pipette 20.0 ml substrate into the reaction flask after mixing substrate with swirling motion.
2. Preheat the substrate for at least 3 minutes at 30 C in a water bath before placing the reaction flask into the titration cup.
3. Add the 1.0 ml of enzyme dilution (low enzyme activity dilutions may use up to 3.0 ml) to the substrate solution and place the reaction vessel into the titration setup.
4. Adjust the pH with 0.1 NaOH to 6.8–6.9 (or manually on an autoburette with 0.05 N NaOH). Start the pH-stat titration. Stirring should always be vigorous without entrapping air into the substrate.
5. Stop the titration after 5 minutes with a constant (linear) rate of alkali addition, though the titration curve is recorded for at least 8 minutes.

Enzyme Control

Analyze a known lipase sample as the first sample to check the substrate.

pH-Stat control

1. The electrode is kept in the substrate for equilibration prior to beginning the analysis.
2. 20.0 ml of substrate that has been temperature equilibrated is titrated to pH—6.90 to 6.95, and the burette is refilled.
3. Titrate for 1–3 minutes to obtain a steady baseline, and set the counter of the burette to zero.
4. Add 1 ml of benzoic acid and start time recording.
5. Read the amount of added titrant after 3 minutes.
6. Calculate the theoretic amount of the titrant needed to titrate the benzoic acid:

$$\begin{aligned} \text{ml 0.05 N NaOH} \atop \text{(or 0.1 N NaOH)} &= \frac{\text{Weight of enzyme[mg]}}{200[\text{ml}]} \times \\ &\quad \frac{1}{122.1[\text{mg/m mol}]} \times \frac{1}{0.05[\text{m mol}]\over \text{ml}} \\ &= \frac{\text{Weighting[mg]}}{1221} \text{ ml 0.05 N NaOH} \end{aligned}$$

where:
122.1 is the molecular weight of benzoic acid
200 is the volume in which the benzoic acid is dissolved
0.05 is the normality of the NaOH It is to be understood that the assay method described above is provided by way of illustration and not by way of limitation, and that other known art accepted methods may be used.

The pH range wherein the lipases exhibit useful activity is between about 5.0–about 13.5, but more desirably is between about 7.0–12.0.

Various commercially available lipase containing preparations are available, such as LIPIDASE from available from the Geo. A. Jeffreys Co., Inc. (Salem, Va.). This preparation is used in the Examples, below. This preparation is described to be a lipase of a fungal origin, which exhibits an enzyme activity level of at least about 10,000 butyric acid units liberated from tributyrin at pH 7.0 and 30° C. per gram, and which is useful in the pH range of 5.0–13.5.

Lipases may also be prepared from certain fungi, which are known to produce lipases, and such lipases harvested from fungi may also be used in the compositions of the invention.

Cellulases

As described, the treatment compositions according to the invention include one or more cellulases. Cellulase is a term generally used to described the group of enzymes which hydrolyze cellulose. As is known, cellulose is a major constituent of paper products, and the use of cellulose as an additive to certain foodstuffs is also becoming increasingly known. Thus, paper products are expected to constitute an appreciable portion of a waste stream.

Cellulases include one or more subcategories of enzymes which hydrolyze subcategories of cellulose which include endocellulases, exocellulases, beta-1,3-glucanases and beta-glucosidases. In the compositions and processes according to the present invention, any of these cellulases may be used alone or in combination but are used preferably in combination. Preferred cellulases for use include those which are derived from microorganisms of the genus Trichoderama, Chrysosporium, Aspergillus, Penicillium, Fusarium, Thielavia, Sporotrichium, Cellulominas, Ruminococcus, and Clostridium. Cellulases are also known to be produced by genetically engineered microorganisms of the genus Bacillus. Particularly preferred microorganisms useful as a source of the cellulase constituent include *Aspergillus niger, Aspergillus aculeatus, Bacillus subtilis, Trichoderma longibrachiatum*, and *Bacillus lentus*. Commercial sources for these cellulases are well known. Examples include those marketed under the tradenames MAXICEL available from the Geo. A. Jeffreys Co., Inc. (Salem Va.) as well as CELLUCLAST 250 1 and CELLUCLAST 100 1 available from Novo Nordisk, Inc., (New York, N.Y.). The cellulase preparation MAXICEL is used in the Examples, below.

The activity of the cellulase enzymes may be expressed in units of cellulase units per gram. Desirably the cellulase constituent which forms part of the enzyme mixture of the invention exhibits an activity of at least about 1000 CU units/gram of the enzyme mixture, and still more desirably exhibits an activity of from about 1000 to about 5000 CU units/gram, at a pH of 7.0. These CU units/gram may also be interchangeably expressed as CMC units determined by known viscosity measurement techniques, which techniques are known and recognized in the art. The cellulase enzyme further desirably exhibits activity in the pH range of about 4.0 to about 9.5, but preferably exhibits activity at a pH in the range of about 5.5 to about 7.5.

Cellulases may also be prepared from certain fungi, which are known to produce cellulase, and such cellulases harvested from fungi may also be used in the compositions of the invention.

While it is appreciated that the activity of a cellulase preparation may be supplied from its supplier, the activity of a cellulase preparation may be determined by known and recognized methods. By way of non-limiting example, one such example assay method is the following assay protocol for the determination of cellulase enzymes derived from *Aspergillus niger*, var., and *Trichoderma reestei*. The assay is based on the time required to reduce the viscosity of a soluble cellulose from 400 centipoises to 300 centipoises at pH 5.0.

Apparatus and Protocol

Viscometer: Use a Brookfield Model LVF or equivalent-type viscometer, with a No. 1 Spindle, capable of rotating at 12 rmp and of being read in centipoises. A suitable viscometer is available from Brookfield Engineering Laboratories, Inc., 240 Cushing Street, Stoughton, Mass. 02072.

Sample Container: Use a 250-ml beaker, or equivalent container, designed for use with the Brookfield viscometer, Berzelius beakers, available as Coming Catalog No. 1140, are suitable for this purpose.

Beater: Use a wire whip hand beater, such as the Ekco Presto-Whip with a spiral cone (available at hardware stores).

Reagents and Solutions

Sodium Acetate Buffer, pH 5.0: Dissolve 34 g. of sodium acetate, NaC2H3O23H2O, in about 800 ml of water, and adjust the pH to 5.0 with glacial acetic acid. Quantitatively transfer the solution into a 1000-ml volumetric flask, dilute to volume with water, and mix.

Standard Solution: Weigh accurately 1 g. of a standard cellulase preparation (available at Cellase 1000 Reference Standard, from G.B. Fermentation Industries, Inc., 1 North Broadway, Des Plaines, Ill. 60016), and dissolve it in 100 ml. of water. Quantitatively transfer the solution into a 1000-ml. volumetric flask, dilute to volume with water, and mix. Each ml. of this solution contains 2.6 cellulase activity (CA) units.

Substrate Solution: Sift 132 g. of sodium carboxymethylcellulose (cellulose gum, Herculese Type 7-LF) through a household-type tea strainer of 40-mesh screen, and add with continuous stirring to approximately 2125 ml. of water. Add 375 ml. of Sodium Acetate Buffer, and continue stirring until most of the gum has gone into solution. Allow the mixture to stand at room temperature for 2 to 3 h. stirring frequently to assure uniform and complete dispersion of the gum. (NOTE: Use only gentle mixing so as not to shear the polymer mechanically.)

Since the substrate may vary from lot to lot, each lot should be checked by the Procedure below before use in assaying the enzyme unknown. The viscosity of the Substrate Solution should be reduced from 400 cps to 300 cps in 277+10 s. by 5.0 ml. of the Standard Solution. If the viscosity-reduction time does not fall within this range, appropriate dilutions of the Substrate Solutions should be made.

Sample Preparation: Prepare a solution of the enzyme preparation in water so that each 5 ml. of the final dilution contains between 2 and 10 cellulase activity (CA) units.

Procedure: Transfer 200 g. of the Substrate Solution into a Sample Container, and equilibrate for 15 min. in a water bath maintained at 35°+0.1°. At zero time rapidly pipette 5.0 ml. of the Sample Preparation into the equilibrated substrate, mix immediately for 15 s. with the Beater, and then lower the viscometer spindle as rapidly as possible into the mixture. Do not remove the Sample Container from the water bath at any time during the determination. Begin stirring at 12 rpm, and start timing with a stopwatch when the reading indicates a viscosity of 400 cps. Continue timing until the viscosity is reduced to 300 cps, and record the elapsed time, Tu in seconds. (NOTE: The elapsed time should fall between 150 and 600 s.; if longer times are required, use a higher concentration of enzyme in the Sample Preparation.)

In the same manner, treat 200 g. of the Substrate Solution with 5.0 ml. of the Standard Solution, and record the elapsed time.

Calculation: One cellulase activity (CA) unit are defined as that quantity of enzyme required to reduce the viscosity of 200 g. of a 5% solution of the specified sodium carboxymethyl cellulose substrate from 400 to 300 cps at 35°+0.1° and pH 5.0, in 1 h.

The activity of the enzyme preparation is calculated from the formula $$CA, units/g = 1000 \times 60 \times 60/(W \times Tu)$$

in which W is the weight, in mg. of cellulase contained in the 5 ml. aliquot of the Sample Preparation used.

It is to be understood that the assay method described above is provided by way of illustration and not by way of limitation, and that other known art accepted methods may be used.

Preservatives

The compositions of the invention desirably include one or more constituents which function as preservatives. Particularly useful are organic solvents providing this effect including $C_{1-5}$ alcohols, $C_{1-5}$ polyols and glycols, polyethylene glycol, polypropylene glycol. Any of these solvents may incorporate an oxygen atom to form the corresponding ether, as well as sorbitol. These organic solvents may be used individually or in mixtures of two or more, but are desirably used individually, and generally may comprise up to about 60% by weight of the liquid compositions according to the invention. In solid compositions (powders, tablets, etc.), the organic solvent(s) may be omitted. Such organic solvents are liquids at room temperature (approximately 68° F., 20° C.), feature good aqueous solubility, and importantly, have been found to be effective in stabilizing the biologically active constituents of the liquid compositions. Preferred amongst these organic solvents are propylene glycol and glycerol, both of which have been found by the inventors to provide the beneficial effects noted above, and which are inexpensive and readily available. Most desirably, propylene glycol, glycerol or sorbitol is included in the inventive compositions in the absence of any other liquids, except of course water. It has been observed by the inventor that the use of only one, or mixtures of two or more of these three materials provides a surprisingly effective effect in maintaining the bacteria in state of reduced activity or a 'dormant' state without the need for other materials. However, when the bacteria is exposed to a lesser concentration of propylene glycol, glycerol or sorbitol the bacteria become significantly more active.

These most preferred materials, propylene glycol, glycerol or sorbitol which function as preservatives for the bacteria provided in the inventive compositions are not to be confused with commercially available preservative preparations such as those sold under various tradenames including DOWICIL, BUSAN, PROXEL etc. Such are preservative preparations are directed to inhibiting the growth of spores or other bacteria which may have been inadvertently introduced to the compositions such as by airbore spores, etc. Such commercially available preservative preparations also are not based on or consist solely of the most preferred preservative materials recited, namely propylene glycol, glycerol or sorbitol.

Optional Ingredients

The treatment compositions of the invention may include one or more optional constituents, such as coloring agents including rheology modifying agents including thickeners, coloring agents such pigments and dyes, opacifiers, naturally occurring or synthetically produced fragrances, fillers, odor neutralizing agents, pH adjusting agents, buffers, surfactants for the solubilization of fats and oils especially one or more nonionic surfactants, micronutrients, as well as other conventionally known additives which although not recited here are known to the art and which do not undesirably reduce the activity levels of the bacteria or enzyme constituents subsequent to the preparation of the treatment composition and prior to its use.

Further enzymes which may also be included in the inventive compositions include but are not limited to: pectinase, carbohydrase, beta-glucanase, hemicellulase and xylanase. The addition of such further enzymes such as pectinase aids in the decomposition of fruit-containing wastes. Carbohydrates are effective in breaking down non-starch polysaccharides, beta-glucanase aids in the breakdown of vegetable gums, and xylanase assists in the decomposition of various types of polymeric gums and natural polymers.

Further optional constituents which may be included in the liquid compositions and which might be considered a food source for the bacteria are micronutrients. Such are known to the art as being useful for maintaining the viability of the bacteria in compositions for extended periods of time, i.e., several months. Such micronutrients are known to the art, and include preparations which include calcium salts, magnesium salts and other salts as well.

These further optional constituents, in total, generally comprise no more than 5 parts by weight of the liquid compositions of the invention, based on the total weight of such a composition.

In the liquid compositions according to the invention it may be desirable to include an effective amount of a buffering agent which will tend to retain the pH of the liquid compositions within acceptable limits, i.e., within limits which will not adversely affect the activity of the biologically active constituents in the liquid preparations taught herein. Examples of buffers include the alkali metal phosphates, polyphosphates, pyrophosphates, triphosphates, tetraphosphates, silicates, metasilicates, polysilicates, carbonates, hydroxides, and mixtures of the same. Certain salts, such as the alkaline earth phosphates, carbonates, hydroxides, can also function as buffers. It may also be suitable to use buffers such materials as borates, aluminates and certain organic materials such as gluconates, succinates, maleates, and their alkali metal salts. These buffers are generally necessary in only minor amounts, generally in amounts of no more than 5 parts by weight based on the total weight of a liquid composition, but desirably are present in substantially lesser amounts, such as in amounts of no more than 1 part by weight based on the total weight of a liquid composition. Desirably, the selected buffer will maintain the pH of the liquid compositions of the invention within the active range for the selected enzymes and microorganisms present, but it is not to be confused with other stabilizer constituents which are directed to reducing or minimizing the denaturation and activity of the biologically active constituents of the invention.

Surfactants

The treatment compositions according to the invention desirably include one or more surfactants, preferably one or more nonionic surfactants. Practically any hydrophobic compound having a carboxy, hydroxy, amido, or amino group with a free hydrogen attached to the nitrogen can be condensed with ethylene oxide or with the polyhydration product thereof, polyethylene glycol, to form a water soluble nonionic surfactant compound. Further, the length of the polyethenoxy hydrophobic and hydrophilic elements may vary. Exemplary nonionic compounds include the polyoxyethylene ethers of alkyl aromatic hydroxy compounds, e.g., alkylated polyoxyethylene phenols, polyoxyethylene ethers of long chain aliphatic alcohols, the polyoxyethylene ethers of hydrophobic propylene oxide polymers, and the higher alkyl amine oxides.

To be mentioned as particularly useful nonionic surfactants are alkoxylated linear primary and secondary alcohols such as those commercially available under the tradenames PolyTergent® SL series (Olin Chemical Co., Stamford Conn.), Neodol® series (Shell Chemical Co., Houston Tex.); as well as the alkoxylated alkyl phenols including those commercially available under the tradename Triton® X series (Union Carbide Chem. Co., Danbury Conn.).

Particularly useful pH ranges of liquid treatment compositions according to the invention are any at which one or more of the enzymes of the enzyme mixture described previously exhibit desirable activity levels. A particularly useful pH range however, is from about 3.5 to about 13.5, more desirably from about 4 to about 10.5, yet more desirably from about 4–9.5, and most desirably about 7.

Manner of Use

As will be appreciated by skilled practitioners in the art, the dosage, frequency of use, as well as the concentration of the active ingredients in the compositions of the invention are interdependent variables. Optimization of these variables is further influenced by the environment within which the compositions are to be used, as well as the operating parameters of the sewage treatment vessel (size, configuration, average residence time of sewage, activity of microorganisms already present in the sewage treatment vessel, etc.) being treated. Determination of these variables may be accomplished by routine methods, in manners known to the skilled practitioner, and the dosage, frequency of use, and concentration of the active ingredients in the compositions may be accordingly established. However, for purposes of illustration, the treatment compositions, especially according to the preferred embodiments, are found to be particularly effective when used in dosage amounts of from 10–100 grams, and used approximately 1–5 times per day in the treatment of an average household of 4 individuals. Naturally, as the frequency of dosing increases per unit time, such as per day, the dosage amount may be somewhat reduced. Most desirably, a total amount of between about 10 to 80 grams of the treatment compositions are provided per day to the macerated foodstuff waste products based on the said average household.

With regard to the garbage disposal apparatus described in this specification, it is generally understood that virtually all known art garbage disposal apparatus may be used satisfactorily. Particularly useful devices include garbage disposal devices include those presently commercially available under the trade name "In-Sink-Erator" (Emerson Electric Co., Chicago Ill.), as well as similar devices. These devices are sometimes also interchangeably referred to as "in-sink" type garbage disposal devices, as they are designed to be affixed to the drain outlet of a sink, or proximate to the drain outlet of a sink such that waste water, and any foodstuff waste products, or other organic materials which are desired to be flushed down and disposed, enter through an inlet of the apparatus, and pass into the interior working chamber(s) of the garbage disposal apparatus. Therein, by mechanical action, such foodstuff waste products are macerated, or otherwise comminuted into smaller particles, and thus become more amenable to be flushed out though an outlet of the garbage disposal apparatus, and into the drain lines, which ultimately lead to the sewage treatment system. Such garbage disposal apparatus may be operated by a variety of mode forces, including electrical, electrical/mechanical, pneumatic, hydraulic and others. Generally, however, for ease of operation and for relative compactness, the garbage disposal apparatus is typically operated by the use of an electrically driven motor which operates to energize and drive blades, cutters, or other device which act to divide and comminute the foodstuff waste products in a grinding or cutting chamber within the interior of the apparatus. In such a system, the application of such a force is usually controlled by an electrically or manually operable switch. Such is typically installed in the proximity of the sink having the garbage disposal apparatus on a wall installation whereby a human operator may close the contact of such switch which energizes the motor of the device.

In accordance with the process of the invention, the treatment compositions are delivered to the garbage disposal apparatus most desirably while macerated foodstuffs are still present within the garbage disposal apparatus, or while such macerated foodstuffs are in the drain line proximate to the outlet of said apparatus. In such a process the treatment compositions are provided directly onto the macerated foodstuff wastes.

The treatment compositions may be delivered to the garbage disposal apparatus either directly or by use of a device. One direct delivery method which is particularly convenient is possible when the treatment compositions are in a solid form such as a tablet, or a pulverized form such as a powder. According to this method, a suitable amount of the solid form of the treatment composition is delivered through the inlet port of the garbage disposal apparatus. A further direct delivery method which is applicable when the treatment composition is a liquid is via the use of a hopper and/or fluid vessel containing a composition of matter which is connected to the garbage disposal apparatus via an intermediate fluid conduit such as a tube or hose, and a valve placed in-stream of said fluid conduit. Such a valve permits or stops the flow of the composition of matter from said hopper or fluid vessel to the intake end of the garbage disposal apparatus. Such a valve may be mechanically actuated, such as by any of a known variety of fluid valves, particularly a manually operable valve. In one exemplary embodiment, the valve is a conventional, normally closed pinch-type clamp placed to pinch a hose extending intermediate the hopper and/or fluid vessel containing the composition of matter according to the invention and the intake end of the garbage disposal apparatus. A user may easily temporarily release the pinch-type clamp to permit a quantity of the composition of matter according to the invention to flow from the hopper and/or fluid vessel and thereby be dispensed to the intake end of the garbage disposal apparatus. In an alternative configuration, the valve may be electrically operated, i.e., such as a solenoid-operated valve, which when energized, sets the valve in an open position, but is otherwise in a normally closed position. Either of these devices, as well as other conventional devices to the process taught herein may be applied.

In an especially preferred method of delivering the treatment compositions according to the invention which is in a liquid form, a vessel is provided with a manually operable pump which delivers a fairly uniform amount of the treatment composition each time the pump is operated. According to such a preferred embodiment, the size and configuration of the pump are judiciously selected such that a substantially consistent dose of the treatment composition present in the flask is conveniently delivered each time the pump is operated by a consumer. In this way, a satisfactory dose may be directly delivered through the inlet port of the garbage disposal apparatus, and onto the macerated foodstuff wastes.

A particular advantage of the processes taught herein is in the "targeted" delivery of the biologically active constituents to the macerated foodstuff waste products. In accordance with the preferred embodiment of the invention, a quantity of a composition of matter which comprises biologically active constituent is supplied via the garbage disposal apparatus including the liquid and/or solid delivery means associated therewith, and as broadly described above, directly to the macerated foodstuff waste products. This process ensures that the treatment compositions, especially the biologically active constituents therein, aid in the rapid or accelerated decomposition of foodstuff waste products. In this manner, the direct product delivery of the biologically active constituent, generally including one or more enzymes, and/or bacteria to the surface of the solids which require rapid decomposition is ensured. Such product delivery system also ensures that upon the contact of the biologically active constituent of the composition of matter with the macerated foodstuff waste products, said biological active constituent can initiate the decomposition function of the breakdown of the macerated foodstuff waste products. This occurs even prior to the eventual delivery of the foodstuff waste products to the primary sewage treatment system, i.e., cesspool sewage treatment plant or septic tank. An attendant advantage of this process is in the surprisingly rapid and high rates of decompositon of the macerated foodstuff waste products which the inventor has found. These rates were significantly higher than might be expected from known art treatment compositions. A further advantage of the targeted delivery system is that the biologically active constituent is contacted with the freshly macerated foodstuff waste products, thus affording a very high proportion of the biological active constituents per unit mass of the foodstuff waste products. Such a proportion is substantially higher than that which is possible by the prior art methods of dosing the septic tank with the composition and matter including a biologically active constituent. This is particularly beneficial, as the biological active constituents (enzymes, bacteria) are contacted directly with an appropriate food source, and begin consuming the foodstuff waste products almost immediately, and before ultimately reaching the septic tank or cesspool. A further benefit is that the macerated foodstuff provides a much greater surface area per unit mass of the foodstuff, in contrast to the same unit mass of foodstuff which is however unmacerated or comminuted.

It is to be understood that although in the preferred embodiments, the fluid and/or solid delivery means is directly associated with the garbage disposal apparatus, it is nonetheless feasible to obtain the desired benefits of the process according to the invention by including a solid and/or fluid delivery means for delivering the treatment compositions intermediate to the drain of the sink and sewage treatment system. Desirably such solid and/or fluid delivery means are located within a few feet of the drain after the outlet of the garbage disposal apparatus. Most desirably, an alternative location would be intermediate or immediately adjacent to the exit port of the garbage disposal apparatus and prior to the "J" or "P" trap associated with a sink. This is typically found within a few linear feet beyond the drain outlet of the sink to which the garbage disposal apparatus is attached. A retrofit kit or system which provides such a solid and/or fluid delivery means adjacent to the exit port of the garbage disposal apparatus and prior to the "J" or "P" trap associated with a sink may be manufactured for use ready in conjunction with known art garbage disposal apparatus. Such an solid and/or fluid delivery means may use any effective means for delivering the treatment composition to the interior of the drain line and may be for example, a manual or electrically actuated metered pump.

In accordance with another aspect of the invention, a process for the treatment of foodstuff waste products is provided. In a broad sense, this process comprises the process steps of: applying to macerated foodstuff waste products either at the time of maceration, or shortly thereafter, the composition of matter which includes biologically active constituents effective in the treatment of the foodstuff waste products.

A preferred process of the invention comprises the steps of: supplying a means for the delivery of a quantity of a solid and/or liquid composition of matter, and delivering the quantity of said composition of matter simultaneously with the operation of the garbage disposal apparatus, or shortly thereafter.

In an alternative embodiment of the process according to the invention, there is provided a process to include the step of: providing a means of delivery of the composition of a solid and/or liquid composition of matter which includes a biologically active constituent, associating said means with the drain line intermediate the outlet of a sink, and a sewage treatment facility, and upon operation of a garbage disposal apparatus also associated with the drain line intermediate the outlet of the sink and a sewage treatment system, delivering a quantity of the composition of matter which includes the biologically active constituent to the drain line, most desirably to the service of macerated foodstuff waste products present in the drain line.

As a still further process according to the invention, there is provided a process for increasing the operating capacity of a septic tank and/or cesspool which comprises the process steps of: providing a means of delivery of the composition of a solid and/or liquid composition of matter which includes a biologically active constituent, associating said means with the drain line intermediate the outlet of a sink, and a sewage treatment facility, and upon operation of a garbage disposal apparatus also associated with the drain line intermediate the outlet of the sink and a sewage treatment system, delivering a quantity of the composition of matter which includes the biologically active constituent to the drain line, most desirably to the surface of macerated foodstuff waste products present in the drain line.

Advantages of one or more of the processes described above include the following benefits. The delivery of an amount of the biologically active portion of a solid and/or liquid composition of matter to the macerated foodstuff waste products ensures a targeted delivery to said particles which require, and very desirably, undergo rapidly decomposition. Such a process ensures that the decomposition process generally is already initiated prior to the delivery of said foodstuff particles to the operating environment of the septic tank. The advantages of such targeted delivery system, including the initiation of the decomposition process, and desirably the development of colonies of bacteria which may be included in certain embodiments of the composition of matter ensures that the rapid decomposition breakup of the food particles treated by the garbage disposal unit is commenced. This is an important advantage, since as such foodstuff particles reach the greater volume of the septic tank, the decomposition of these particles has already begun. In this way, the foodstuff particles are not dependent upon the colonization from other sources of bacteria, or the breakdown from enzymes which may be present in the septic tank. This is an important feature in that such a rapid decomposition, particularly at the initiation at the garbage disposal unit, or shortly thereafter, ensures not only rapid breakdown of these food waste particles, but also provides a source of replenishing any enzymes and/or bacteria in the septic tank. The consequent and ancillary advantage of the processes which are taught here upon the use of the apparatus, and/or, the practice of the process described above, is in the periodic replenishment of the biologically active constituents in the working volume of the septic tank. This is a further beneficial feature, particularly according to a construction wherein the dosing of a septic tank treatment composition, including biologically active constituents, is not practiced at regular intervals. In accordance with the process of the invention, this shortcoming is overcome with each activation of the food and/or solid delivery means, as a quantity of the composition of matter containing biologically active constituents is delivered to the foodstuff waste products, which are then contacted with the enzymes and/or bacteria in said composition. These enzymes may initiate the breakdown of the foodstuff waste products, and the bacteria may initiate colonization. Such a freshly macerated foodstuff waste product also provides a rich food source for the bacteria which may colonize at a very rapid rate.

This is an important advantage in that the macerated foodstuff waste product also acts as a physical carrier medium for the enzyme and/or bacteria as it is flushed down the drain lines and eventually enters the sewage treatment system. In contrast, according to the prior art processes a quantity of a biologically active constituent was flushed down the drain line, generally with a larger volume of water, and the water provided a carrier medium for the biologically active constituent. However, such water generally does not provide an effective food source, and once entering the working environment of the septic tank, was immediately diluted with the greater volume of water therein. Thereafter, the effective operation of the biologically active constituent in great part depends upon the probability of making an appropriate food source within the substantially large working volume of the septic tank. A particular advantage provided by the processes according to the invention as the necessary foodstuff waste products act as a physical carrier medium and as a food source. Upon entry into the environment of the working volume of the septic tank, the bacteria of the present invention are more likely to flourish and effectively treat the remaining volume of the waste products in the septic tank. The advantage of this process, and of its results are especially beneficial if it is realized that generally a garbage disposal unit is used at least once a day, and generally is utilized several times a day. In this manner, one, to several dosings per day are to be normally expected and, except for a sewage treatment system environment that is left vacant, it is to be understood that a relatively uniform and periodic dosing interval of the downstream sewage treatment system, specifically in the case of septic tanks and cesspools, is achieved as a result of the inventive processes taught herein.

A striking and very beneficial advantage of the processes, as well as use of the apparatus as taught herein, is that a net overall improvement of the operating efficiency of the septic tank and/or cesspool is realized. Such is generally very substantial, due to the targeted delivery of the biologically active constituents in a composition of matter to the freshly macerated foodstuff waste products, and the operation of these foodstuff waste products both as a physical carrier medium, and a food source for the biologically active constituents through the drain lines and into the septic tank or cesspool. It is believed that in many, if not most, instances, a generally described increase in septic tank volume, believed to be necessary in the past, is now no longer required. Thus, by use of the processes and compositions of matter according to the invention, it is believed that constructions which utilize a septic tank and/or cesspool as their primary sewage treatment system may now enjoy the benefits of an in-sink type garbage disposal apparatus without the necessity of replacing said septic tank or cesspool with one of increased operating capacity. This is achieved by use of the apparatus and/or the process as described in this specification. This is an important advantage, particularly when it is realized that a significant proportion of residential constructions rely upon a septic tank as their primary sewage treatment system.

As used throughout this specification and in the accompanying examples below, the terms "parts by weight" or "percentage weight" are used interchangeably in the specification and in the following examples wherein the weight percentages of each of the individual constituents are indicated in weight percent based on the total weight of the particular composition of which it forms a part, unless indicated otherwise As used throughout this specification and claims, the term "macerated" is to be understood to be interchangeable with terms including comminuted, ground and pulverized and is intended to describe the condition of solids which have been treated by a garbage disposal apparatus as described in this specification.

Various embodiments of the instant invention are described in the accompanying examples.

EXAMPLES

Several exemplary and preferred formulations of liquid compositions according to the invention, each of which was formed by simple mixing of the noted constituents in measured amount to the volume of water using manual or mechanical stirring, are described below. All of the proportions are listed in parts by weight based on the total overall weight of the particular formulation.

A comparative exemplary composition typical of presently commercially available septic tank treatment products comprises the following constituents:

| COMPARATIVE EXAMPLE "C1" | |
| --- | --- |
| 79.69% wt. | of an aqueous mixture containing: |
| | $1.4 \times 10^8$ bacteria/gram of aqueous bacteria complex+ |
| | 1829 CDU/gram protease enzymes |
| | 12200 MWU/gram amylase enzymes |
| | 10 LU/gram lipase enzymes |
| | 975 CU/gram cellulase enzymes |
| 20% wt. | propylene glycol |
| 0.0005% wt. | FD&C Blue #1 |
| 0.3% wt. | perfume, proprietary composition |

+aqueous bacteria complex

A composition according to the present invention having a total weight of 100 grams was prepared and comprised the following constituents:

| EXAMPLE "E1" | |
| --- | --- |
| — | aqueous bacteria complex+ |
| 20% wt. | 500,000 CDU/gram protease enzymes |
| 20% wt. | 160,000 MWU/gram amylase enzymes |
| 20% wt. | 10,000 LU/gram lipase enzymes |
| 40% wt. | 1,500 CU/gram cellulase enzymes |
| — | propylene glycol |
| — | FD&C Blue #1 |
| — | perfume, proprietary composition |

+aqueous bacteria complex

A further example composition according to the present invention having a total weight of 100 grams is prepared comprising the following constituents:

| EXAMPLE "E2" | |
| --- | --- |
| 77.79% wt. | of an aqueous mixture containing: |
| | $1.0 \times 10^8$ bacteria/gram of aqueous bacteria complex+ |
| | 5,000 CDU/gram protease enzymes |
| | 12,000 MWU/gram amylase enzymes |
| | 100 LU/gram lipase enzymes |
| | 1,000 CU/gram cellulase enzymes |
| 20% wt. | propylene glycol |
| 0.0005% wt. | FD&C Blue #1 |
| 0.2% wt. | perfume, proprietary composition |
| 2% wt. | nonionic surfactant |

+aqueous bacteria complex

A 100 gram sample of a further exemplary composition according to the present invention is prepared comprising the following constituents:

| EXAMPLE "E3" | |
| --- | --- |
| 76.79% wt. | of an aqueous mixture containing: |
| | $5.0 \times 10^8$ bacteria/gram of aqueous bacteria complex+ |
| | 10,000 CDU/gram protease enzymes |
| | 20,000 MWU/gram amylase enzymes |
| | 1000 LU/gram lipase enzymes |
| | 5,000 CU/gram cellulase enzymes |
| 20% wt. | propylene glycol |
| 0.0005% wt. | FD&C Blue #1 |
| 0.2% wt. | perfume, proprietary composition |
| 3% wt. | nonionic surfactant |

+aqueous bacteria complex which included

A still further 100 gram sample of an exemplary composition according to the present invention is prepared comprising the following constituents:

| EXAMPLE "E4" | |
| --- | --- |
| 88.79% wt. | of an aqueous mixture containing: |
| | $1.0 \times 10^6$ bacteria/gram of aqueous bacteria complex+ |
| | 5,000 CDU/gram protease enzymes |
| | 12,0000 MWU/gram amylase enzymes |
| | 100 LU/gram lipase enzymes |
| | 1,000 CU/gram cellulase enzymes |
| 10% wt. | propylene glycol |
| 0.0005% wt. | FD&C Blue #1 |

-continued

EXAMPLE "E4"

| 0.2% wt. | perfume, proprietary composition |
| 1% wt. | nonionic surfactant |

+aqueous bacteria complex

Certain of these formulations were evaluated as to their efficacy in breakdown of freshly macerated foodstuff waste solids in accordance with the following general protocol.

The compositions according to C1 through E1–E3 were based on the materials provided by the Geo. A. Jeffreys Co. as described above in the specification.

For each formulation tested, a set of five 250 ml flasks was used. The initial weight of each empty flask was recorded. To each of the flasks, 80 ml of a freshly macerated foodstuff waste solid and a buffer was added as a test material. This freshly macerated foodstuff waste solid was the output of an in-sink garbage disposal apparatus to which had been supplied vegetables, meat, grain products, dairy products, fruits, fats and oil from mineral and vegetable sources, and water. Each flask now containing the test material was reweighed. To each flask was added 0.25 grams of one of the formulations described above, and then the flasks were allowed to incubate at room temperature (approx. 75° F.) for three days. Thereafter, the solids were filtered from of each flask onto #1 Whatman filter paper which had been previously weighed and its weight recorded. Thereafter, each of the filter papers and their filtered solids were dehydrated in a warm oven (105° F.) until no change in the mass of each filter paper and their filtered solids was observed. The change in the percent solids for each of the flasks was determined in accordance with the following equation:

$$\frac{(\text{weight dried filter paper} + \text{dried filtrate}) - \text{weight dry filter paper}}{(\text{weight flask} + \text{test material}) - \text{weight dry flask}} = \% \text{ solids}$$

The results of these evaluations are reported on Table 1, below. Also indicated on Table 1 is a "control" wherein the test protocol described above was performed, but without the addition of any formulation. This demonstrated the natural rate of decomposition of the test materials within the flasks.

TABLE 1

| Initial weight of test flasks and test samples | % solids | Average % solids = 1.91 |
|---|---|---|
| test flask 1 | 2.22 | |
| test flask 2 | 2.04 | |
| test flask 3 | 1.64 | |
| test flask 4 | 1.80 | |
| test flask 5 | 1.83 | |
| Formulation according to C1 | % solids | Average % solids = 1.13 |
| test flask 1 | 1.25 | |
| test flask 2 | 1.16 | |
| test flask 3 | 1.08 | |
| test flask 4 | 1.08 | |
| test flask 5 | 1.09 | |
| Formulation according to E1 | % solids | Average % solids = 0.69 |
| test flask 1 | 0.72 | |
| test flask 2 | 0.66 | |
| test flask 3 | 0.70 | |
| test flask 4 | 0.67 | |
| test flask 5 | 0.68 | |
| Control (untreated test flasks with test samples) | % solids | Average % solids = 1.39 |
| test flask 1 | 1.32 | |
| test flask 2 | 1.42 | |
| test flask 3 | 1.43 | |
| test flask 4 | 1.43 | |
| test flask 5 | 1.43 | |

As may be seen from the results on Table 1, the change in the percent solids for each of the flasks in the untreated "Control" series exhibited the least amount of change in %solids. The flasks treated with the "C1" composition showed a slight improvement in the digestion of the solids as compared to both the initial weight, and to the "Control" series. The series of flasks treated with the exemplary "E1" composition showed a substantially superior rate of digestion of the solids as compared to any of the other series of flasks and samples evaluated, and was significantly better than the results of the C1 series of flasks. The improvement in the amount of digestion of the macerated foodstuff waste products is surprising, especially in light of the relatively short duration (3 days) of the test.

While the invention is susceptible of various modifications and alternative forms, it is to be understood that specific embodiments thereof have been shown by way of example in the drawings which are not intended to limit the invention to the particular forms disclosed; on the contrary the intention is to cover all modifications, equivalents and alternatives falling within the scope and spirit of the invention as expressed in the appended claims.

What is claimed is:

1. A biologically active treatment composition for the treatment of macerated foodstuff compositions, said treatment composition comprising per gram:
   0–25% wt. of an aqueous bacteria complex having at least $1.0 \times 10^6$ bacteria/gram of bacteria complex;
   75–89.99% wt. of an aqueous enzyme mixture containing:
   at least $5 \times 10^3$ CDU/gram protease enzymes;
   at least $1.2 \times 10^4$ MWU/gram amylase enzymes;
   at least $1 \times 10^2$ LU/gram lipase enzymes; and
   at least $1 \times 10^3$ CU/gram cellulase enzymes;
   10–20% wt. of propylene glycol as a preservative constituent;
   0–25% wt. of one or more nonionic surfactants; and
   0–10% wt. of one or more optional constituents, selected from the group consisting of coloring agents, fragrancing compositions, odor neutralizing compositions, micronutrients, pH adjusting agents, and thickening agents.

2. The treatment composition of claim 1, wherein the bacteria complex is present in an amount of from about 1% wt. to about 25% wt.

3. The treatment composition of claim 2 in which the bacteria complex has at least $1.0 \times 10^8$ bacteria/gram.

4. The treatment composition of claim 1, wherein the protease enzymes have an activity of at least about $5 \times 10^5$ CDU/gram.

5. The treatment composition of claim 1, wherein the amylase enzymes have an activity of at least about $1.6 \times 10^4$ MWU/gram.

6. The treatment composition of claim 1, wherein the lipase enzymes have an activity of at least about $1 \times 10^3$ LU/gram.

7. The treatment composition of claim 1, wherein the cellulase enzymes have an activity of at least about $5 \times 10^3$ CU/gram.

8. The treatment composition of claim 1, further comprising at least one enzyme selected from the group consisting of pectinases, beta-glucanases, hemicellulases, and xylanases.

9. The composition according to claim 3 wherein the balance to 100% wt. comprises water.

* * * * *

UNITED STATES PATENT AND TRADEMARK OFFICE
CERTIFICATE OF CORRECTION

PATENT NO. : 6,121,032
DATED : SEPTEMBER 19, 2000
INVENTOR(S) : EDWARD MATTHEW COONEY, JR.

It is certified that error appears in the above-identified patent and that said Letters Patent is hereby corrected as shown below:

At column 22, line 48, delete "5x103" and insert --$5 \times 10^3$--.

At column 22, line 49, delete "5x104" and insert --$5 \times 10^4$--.

At column 22, line 50, delete "5x102" and insert --$5 \times 10^2$--.

At column 22, line 51, delete "5x103" and insert --$5 \times 10^3$--.

Signed and Sealed this

Seventeenth Day of April, 2001

Attest:

NICHOLAS P. GODICI

Attesting Officer

Acting Director of the United States Patent and Trademark Office